Nov. 25, 1958   T. W. MUSSLEWHITE   2,861,647
OIL AND GAS SEPARATOR
Filed Oct. 1, 1957   2 Sheets-Sheet 1

INVENTOR.
THOMAS W. MUSSLEWHITE,
BY
McMorrow, Berman + Davidson
ATTORNEYS.

Nov. 25, 1958

T. W. MUSSLEWHITE 2,861,647

OIL AND GAS SEPARATOR

Filed Oct. 1, 1957

INVENTOR.
THOMAS W. MUSSLEWHITE,
BY
McMorrow, Berman + Davidson
ATTORNEYS.

United States Patent Office 2,861,647
Patented Nov. 25, 1958

2,861,647

OIL AND GAS SEPARATOR

Thomas W. Musslewhite, Arp, Tex.

Application October 1, 1957, Serial No. 687,479

3 Claims. (Cl. 183—2.7)

This invention relates to devices for separating gas from liquid, and more particularly to a device for separating gas from oil containing same.

A main object of the invention is to provide a novel and improved device for separating gas from oil, said device being simple in construction, being efficient in operation, and requiring a minimum amount of human supervision.

A further object of the invention is to provide an improved device to separate gas from liquid containing same, said device involving relatively inexpensive components, being reliable in operation, having a high capacity for a given size, being arranged so that the liquid and gas may be withdrawn therefrom substantially continuously and with only a relatively small amount of resistance, and being provided with means for preventing the formation of a vortex adjacent the outlet conduit thereof, thus insuring smooth operation of the device.

Further objects and advantages of the invention will become apparent from the following description and claims, and from the accompanying drawings, wherein:

Figure 1:
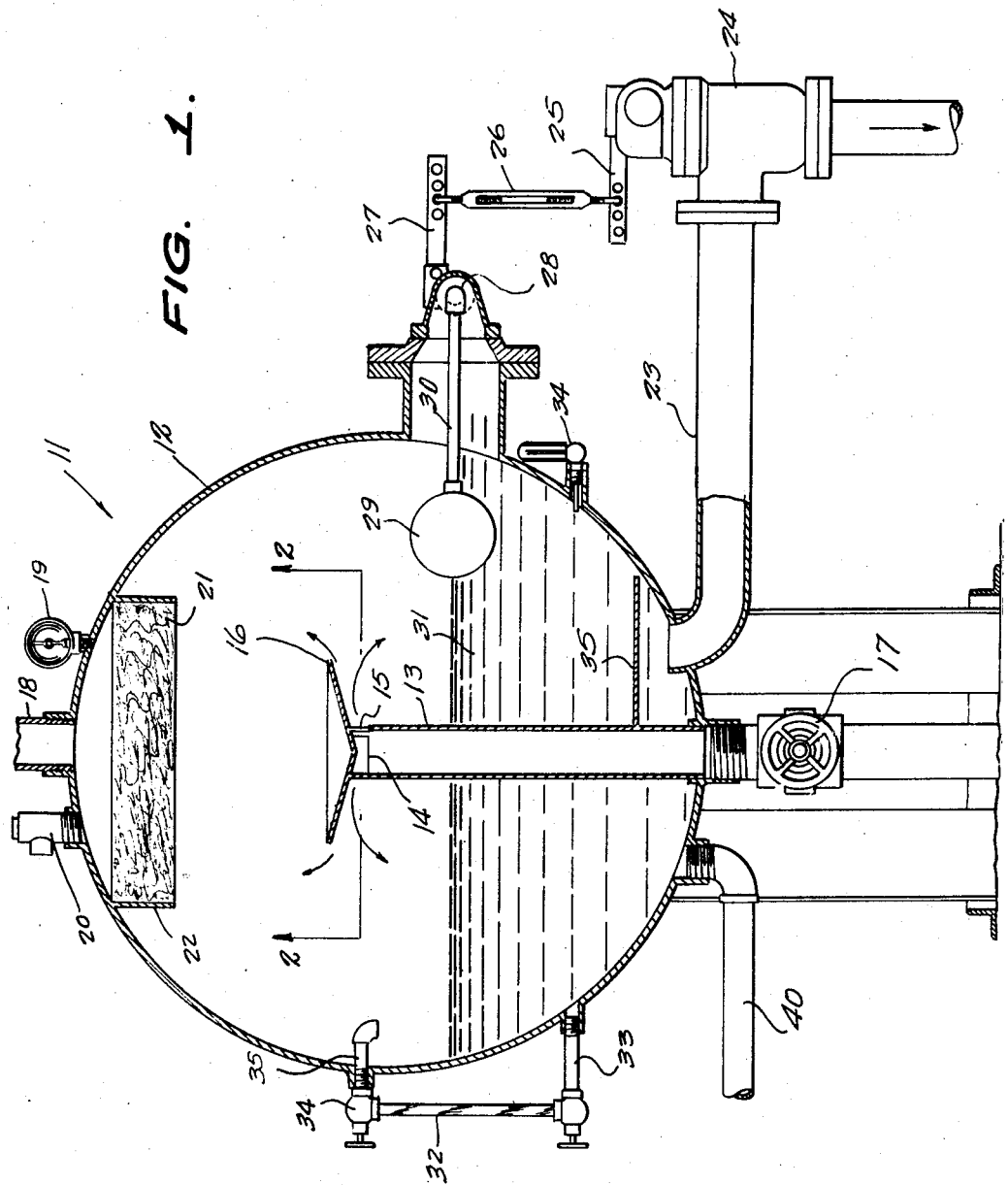
Figure 1 is a vertical cross sectional view taken through a device for separating gas from liquid constructed in accordance with the present invention.
Figure 2:
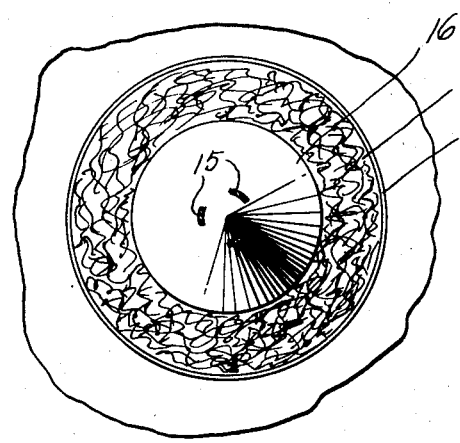
Figure 2 is an enlarged horizontal cross sectional view taken substantially on the line 2—2 of Figure 1.

Referring to the drawings, and more particularly to Figures 1 and 2, 11 generally designates a device to separate gas from liquid according to this invention. Said device comprises a substantially closed, generally spherical chamber 12 provided with a vertical inlet conduit 13 extending upwardly through the bottom of the chamber and having an open top end, shown at 14. The top end of the conduit member 13 is formed with a plurality of upstanding lug elements 15 spaced around the rim of the top end of the conduit, and rigidly secured to said lug elements above and adjacent the open top end of the inlet conduit is a generally circular baffle plate 16 in the form of a shallow cone arranged with its concave portion facing upwardly, as shown in Figure 1, whereby the baffle member 16 presents a downwardly convergent conical surface directly facing and located closely adjacent to the open top end 14 of the conduit 13.

As shown in Figure 1, the inlet conduit 13 is provided externally of the chamber 12 with a manually operated control valve 17, which, when opened, admits the mixture to be separated, for example, oil and gas into the chamber 12.

Designated at 18 is a gas outlet conduit which is connected to the top of the chamber, preferably but not necessarily in vertical alignment with the inlet conduit 13, the top of the chamber being further provided with a pressure gauge 19 and a pressure relief valve 20. Designated at 21 is a porous, horizontally extending filter unit which is secured in a suitable holder 22 in the upper portion of the chamber between the connection of the gas outlet conduit to said chamber and the space above the circular baffle member 16, as is clearly shown in Figure 1. The filter unit 21 is of any suitable material of a porous nature adapted to allow gas to pass therethrough but to trap particles of liquid and to cause the liquid to alternately drip back into the lower portion of the chamber. Connected to the bottom portion of chamber 12 is a liquid outlet conduit 23 which is provided with a float-controlled valve 24, as shown. The valve 24 is of generally conventional construction and is provided with an operating arm 25 which is connected by an adjustable link member 26 to an arm 27, the arm 27 being secured to the external portion of a float shaft 28. A float member 29 is secured by an arm 30 to the internal portion of the shaft 28, whereby the float 29 is operatively connected to the valve 24 to cause the valve to open when the liquid 31 in chamber 12 rises above a predetermined level. As shown, the float 29 is located below the open top end 14 of the conduit 13 by a substantial distance so that liquid accumulating in the chamber 12 will always be a substantial distance below the top end 14 of the conduit 13. When the liquid level rises, the float 29 causes the valve 24 to open, allowing the liquid to drain from the chamber.

A sight glass 32 is provided at one side of the chamber, as shown, whereby the liquid level will be indicated visually. The bottom end of the sight glass 32 is connected by a conduit 33 to the chamber 12 at a point a substantial distance below the desired liquid level in the chamber, and the top end of the sight glass 32 is connected through a manually controlled valve 34 in a conduit 35 to the space in chamber 12 above the desired liquid level therein.

As will be readily apparent, when the valve 34 is opened, the level of the liquid in the sight glass 32 will always correspond to and be identical with the level of the liquid 31 in the chamber 12.

The lower portion of chamber 12 is also provided with a thermometer 34 so that the temperature of the liquid 31 will be always indicated.

Designated at 35 is a horizontally extending baffle plate which is secured to the lower portion of the segment of conduit 13 contained within chamber 12, the baffle plate 35 being of substantial area and being located above and adjacent to the connection of the liquid outlet conduit 23 to the chamber. The plate 35 is spaced sufficiently close to the connection of conduit 23 to prevent the formation of a vortex as the liquid passes from the chamber into the conduit 23, but is spaced sufficiently from the connection to prevent any appreciable resistance to flow from being developed by the presence of the baffle plate 35. By preventing the tendency to form a vortex or channel adjacent to the outlet connection, the baffle plate 35 serves to promote even flow of liquid from the chamber 12.

In operation, the mixture of gas and liquid is allowed to enter the chamber by opening the valve 17, the mixture passing upwardly through the open top end 14 of the conduit 13 and engaging against the downwardly convergent surfaces of the horizontally mounted baffle plate member 16. The liquid is separated from the gas by the impact of its engagement with the baffle plate 16, the liquid dropping into the lower portion of chamber 12 and the gas passing upwardly through the filter unit 21 to the gas discharge conduit 18. The liquid is drawn off from the chamber as its level rises to a predetermined value, the rise of the liquid to said value causing the discharge valve 24 to be opened by the action of the element 29, as above described.

A drain conduit 40 is connected to the lower portion of the chamber 12 to allow sediment, water, or other undesirable material, heavier than the liquid, to be drained off whenever necessary.

The liquid and gas mixture may be admitted from any source, for example, may comprise the mixture of gas and oil from a well. The mixture from the oil well would ordinarily be under substantial pressure and therefore would flow upwardly through the conduit 13 and emerge from its top end 14 with substantial velocity, providing considerable impact as it strikes against the downwardly convergent bottom surface of the baffle plate 16. The impact serves to release the gas from the liquid and provide the separating action.

Figure 3:
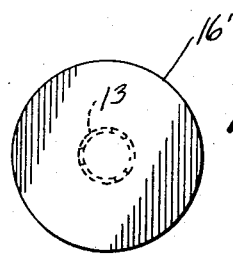
Figure 3 is a top plan view of a modified form of circular baffle element adapted to be employed in a separating device according to the present invention.
Figure 4:
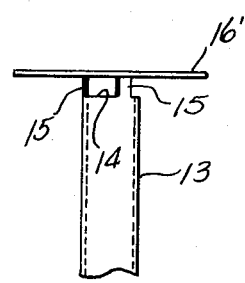
Figure 4 is a side elevational view of the baffle element of Figure 3 and its connection to the top end of the inlet conduit of the device.

Figures 3 and 4 illustrate a modification wherein the substantially circular baffle plate, designated at 16' comprises a flat disc of any suitable rigid material, similar to the rigid material employed for the conical member 16 in the previously described form of the invention, the disc 16' being rigidly secured in horizontal position and in coaxial relationship with the inlet conduit 13, for example, being rigidly secured to the top ends of the upstanding lugs 15 on the top of conduit 13, as shown. As in the case of the baffle member 16, the disc 16' is mounted horizontally above and adjacent to the open top end 14 of the conduit 13 and functions in a similar manner to cause the gas to be shaken loose from the liquid as the mixture strikes the baffle plate.

Figure 5:
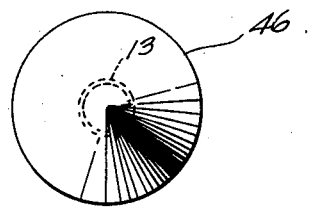
Figure 5 is a top view of a further modified form of circular baffle element adapted to be employed in a separating device according to this invention.
Figure 6:
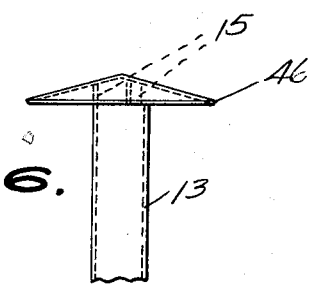
Figure 6 is a side elevational view of the baffle member of Figure 5, showing its connection to the top end of the inlet conduit of the device.

Figures 5 and 6 illustrate a further modification wherein the generally circular baffle member comprises a downwardly concave, shallow cone secured to the top ends of the lugs 15 in the same manner as in the previously described forms of the invention. The downwardly concave cone, shown at 46 in Figures 5 and 6 presents an upwardly convergent conical surface to the mixture of gas and liquid emerging from the open top end of the conduit 13, the impact of the mixture with the baffle member 46 causing the gas to be shaken loose from the liquid.

Figure 7:
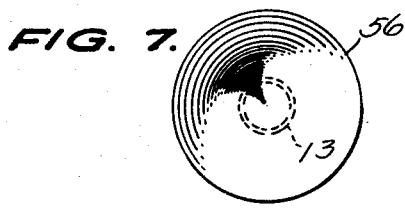
Figure 7 is a top plan view of a still further modified form of circular baffle element adapted to be employed in a separating device according to this invention.
Figure 8:
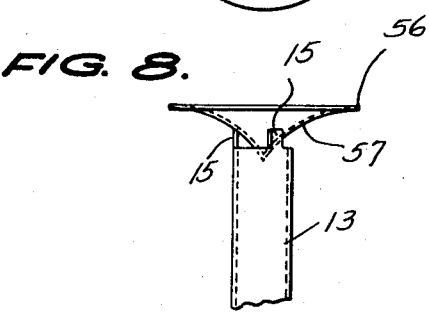
Figure 8 is a side elevational view of the circular baffle element of Figure 7, showing its connection to the top end of the inlet conduit of the device.

Figures 7 and 8 illustrate a further modified form of generally circular horizontal baffle member which may be employed on the top end of the conduit 13, said baffle member comprising a generally circular member 56 having the sloping downwardly concave and downwardly convergent annular bottom surface 57 which is coaxially arranged above the conduit 13 and which is rigidly secured thereto by the upstanding lugs 15. As shown in Figure 8, the vertex of the member 56 may extend downwardly into the top end of the conduit 13, but the member 56 presents a downwardly convergent but annularly arcuately curved impact surface for the gas and liquid mixture which acts generally in the same manner as in the previously described forms of the invention to cause the gas to be shaken loose from the liquid responsive to the impact of the gas and liquid mixture with the baffle surface.

While certain specific embodiments of an improved device to separate gas from liquid have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A device to separate gas from liquid comprising a closed chamber, a vertical inlet conduit extending upwardly through the bottom of the chamber and having an open top end, a downwardly convex baffle member mounted horizontally in vertical alignment with and above and adjacent the top end of said inlet conduit and presenting a closed downwardly convergent surface directly facing and closely adjacent to said top end, said downwardly convergent surface being directly engageable by liquid and gas mixture emerging from said top end, whereby to release the gas from the liquid, a gas outlet conduit connected to the top of said chamber, a liquid outlet conduit connected to the bottom of said chamber, a float member in said chamber below the level of the open top end of said inlet conduit, a valve in said liquid outlet conduit, and means operatively connecting said float member to said valve.

2. A device to separate gas from liquid comprising a closed chamber, a vertical inlet conduit extending upwardly through the bottom of the chamber and having an open top end, a downwardly convex baffle member mounted horizontally in vertical alignment with and above and adjacent the top end of said inlet conduit and presenting a closed downwardly convergent surface directly facing and closely adjacent to said top end, said downwardly convergent surface being directly engageable by liquid and gas mixture emerging from said top end, whereby to release the gas from the liquid, a gas outlet conduit connected to the top of said chamber, a liquid outlet conduit connected to the bottom of said chamber, a horizontal baffle plate of substantial area mounted in the lower portion of said chamber above and adjacent the connection of said liquid outlet conduit thereto, a float member in the intermediate portion of said chamber below the level of the open top end of said inlet conduit and above said baffle plate, a valve in said liquid outlet conduit, and means operatively connecting said float member to said valve.

3. A device to separate gas from liquid comprising a closed chamber, a vertical inlet conduit extending upwardly through the bottom of the chamber and having an open top end, a substantially conical, downwardly convex baffle member mounted horizontally above and adjacent the top end of and in coaxial relation to said inlet conduit and presenting a closed downwardly convergent surface directly facing and closely adjacent to said top end, said downwardly convergent surface being directly engageable by liquid and gas mixture emerging from said top end, whereby to release the gas from the liquid, a gas outlet conduit connected to the top of said chamber, a porous horizontally extending filter unit mounted in the upper portion of said chamber below the connection of said gas outlet conduit thereto, a liquid outlet conduit connected to the bottom of said chamber, a horizontal baffle plate of substantial area mounted in the lower portion of said chamber above and adjacent the connection of said liquid outlet conduit thereto, a float member in the intermediate portion of said chamber below the level of the open top end of said inlet conduit and above said baffle plate, a valve in said liquid outlet conduit, and means operatively connecting said float member to said valve.

References Cited in the file of this patent

UNITED STATES PATENTS

| | | |
|---|---|---|
| 1,549,894 | Adams | Aug. 18, 1925 |
| 2,353,138 | Beach | July 11, 1944 |
| 2,511,351 | Laidley | June 13, 1950 |
| 2,777,533 | Segrest | Jan. 15, 1957 |
| 2,828,818 | Wright | Apr. 1, 1958 |